(12) United States Patent
Umemoto et al.

(10) Patent No.: US 7,874,016 B2
(45) Date of Patent: Jan. 18, 2011

(54) SCANNING PROBE MICROSCOPE AND SCANNING METHOD

(75) Inventors: Takeshi Umemoto, Chiba (JP); Norio Ookubo, Chiba (JP)

(73) Assignee: SII Nano Technology Inc., Chiba-shi, Chiba (JP)

( * ) Notice: Subject to any disclaimer, the term of this patent is extended or adjusted under 35 U.S.C. 154(b) by 456 days.

(21) Appl. No.: 11/961,847

(22) Filed: Dec. 20, 2007

(65) Prior Publication Data

US 2008/0156988 A1 Jul. 3, 2008

(30) Foreign Application Priority Data

Dec. 22, 2006 (JP) ............... 2006-345869

(51) Int. Cl.
- G01Q 10/06 (2010.01)
- G01Q 20/04 (2010.01)
- H01J 37/26 (2006.01)

(52) U.S. Cl. ............... 850/4; 850/1; 850/2; 850/5; 850/7

(58) Field of Classification Search ............... 250/306, 250/307, 309, 310, 311; 430/296, 297, 298; 850/1, 2, 3, 4, 5, 6, 7, 8, 9, 10, 11, 19, 20, 850/26, 33, 37, 38, 39; 73/104, 105; 324/500, 324/501, 527, 756, 762

See application file for complete search history.

(56) References Cited

U.S. PATENT DOCUMENTS

| | | | | |
|---|---|---|---|---|
| 5,283,442 A | * | 2/1994 | Martin et al. | 250/559.22 |
| 5,412,980 A | | 5/1995 | Elings et al. | |
| 6,881,954 B1 | * | 4/2005 | Morimoto et al. | 850/7 |
| 2001/0012394 A1 | * | 8/2001 | Yoshida | 382/149 |
| 2006/0113472 A1 | * | 6/2006 | Shigeno et al. | 250/310 |
| 2006/0283240 A1 | * | 12/2006 | Struckmeier et al. | 73/105 |
| 2008/0087077 A1 | * | 4/2008 | Mininni | 73/105 |

FOREIGN PATENT DOCUMENTS

| | | |
|---|---|---|
| JP | 2732771 B | 12/1997 |
| JP | 2002-14025 A | 1/2002 |
| JP | 2005-69851 A | 3/2005 |

* cited by examiner

*Primary Examiner*—Jack I Berman
*Assistant Examiner*—Nicole Ippolito Rausch
(74) *Attorney, Agent, or Firm*—Brinks Hofer Gilson & Lione

(57) ABSTRACT

To realize to adapt to a shape of a surface, shorten a measurement time period and promote a measurement accuracy by setting a sampling interval in accordance with a slope of the shape of the surface and controlling a stylus in accordance with the interval, there is provided a scanning probe microscope, in which in scanning the stylus, an observation data immediately therebefore is stored as a history, the sampling interval in X or Y direction is set at each time based on a shape of the observation data, and the stylus is scanned to a successive sampling position.

9 Claims, 5 Drawing Sheets

SCANNING PROBE MICROSCOPE AND SCANNING METHOD

RELATED APPLICATIONS

This application claims priority under 35 U.S.C. §119 to Japanese Patent Application No. JP2006-345869 filed Dec. 22, 2006, the entire content of which is hereby incorporated by reference.

BACKGROUND OF THE INVENTION

1. Field of the Invention

The present invention relates to a scanning probe microscope and a scanning method capable of providing a distribution of information of a shape or a physical property of a surface of a sample by scanning the surface of the sample by vibrating a stylus above the surface of the sample.

2. Description of the Related Art

In a related art, there is known a scanning probe microscope including a scanning tunnel microscope or an atomic force microscope with an object of observing a fine shape or a material physical property of a sample for providing information thereof by scanning a surface of a sample by a stylus.

Taking an example, there is known an ultra low force atomic force microscope for observing a shape or the like of a surface of the sample by scanning the surface by vibrating a stylus in a vertical direction relative to the surface of the sample while maintaining an average distance to the surface of the sample constant (refer to, for example, Japanese Patent Specification No. 2732771).

In the ultra low force atomic force microscope, that the stylus is vibrated in the vertical direction achieves an effect of weakening of an influence of a friction force operated between the stylus and the surface of the sample, or a surface tension by a surface adhering water layer constituting an adverse influence in scanning the stylus in parallel with the surface of the sample.

In recent years, small-sized formation and high degree formation of a working dimension is promoted in a technology of working a semiconductor or the like, and a necessity of measuring a fine shape of a structure having a high aspect ratio, or a steep inclined face constituting the structure have been increased.

According to a scanning probe microscope of a related art, observation data are acquired at constant sampling intervals. Therefore, when a high aspect shape mixed with a region having a steep inclination and a flat region is measured, in order to measure the steep inclination by a necessary shape resolution, it is necessary to take the sampling interval more densely than that of the flat region, and when the sampling interval is constant, a number of unnecessary sampling points is increased in the flat region.

In order to avoid the problem, a number of proposals have been made as methods of variably setting a sampling interval while measuring a shape data (for example, JP-A-2002-014025).

On the other hand, when a high aspect ratio shape is measured, other problem is also present. That is, in comparison with an amplitude of vibrating a stylus in a vertical direction in a normal ultra low force atomic force microscope, a variation in height direction is excessively large, and therefore, there is also a case in which it is difficult to accurately follow a shape in scanning. In recent years, as one of methods of avoiding the difficulty, there is proposed a scanning method of repeating an operation in which a stylus is moved down in a vertical (Z) direction at the sampling point to be proximate to a surface to thereby catch a shape and successively moved up to be remote therefrom and moved to a next sampling point, a so-to-speak SIS mode (refer to JP-A-2005-069851).

In the SIS mode, there are needed time periods of making the stylus proximate to and remote from the sample in distances therebetween for respective sampling points, and a time period required for a total of scanning is prolonged along with a number of sampling points. Therefore, an unnecessarily large number of the sampling points signifies a problem of an unnecessarily long measuring time period.

With regard to the problem, a method of variable sampling proposed in a scanning probe microscope of a background art is not applicable to the scanning probe microscope of the scanning method of JP-A-2005-069851 mentioned above. For example, the scanning probe microscope of JP-A-2002-014025 is applicable only to a scanning method in which a stylus always traces a surface, and is not applicable to the scanning probe microscope of JP-A-2005-069851 mentioned above.

SUMMARY OF THE INVENTION

It is an object of the invention to provide a scanning method and a scanning probe microscope realizing to follow accurately a shape of a surface, shorten a measurement time period and promote a measurement accuracy by setting a sampling interval in accordance with a slope of the shape of the surface and controlling a stylus in accordance with the sampling interval.

According to a scanning probe microscope of the invention, a slope of a surface is calculated based on observation data sampled at a current time point and therebefore in sampling in scanning. When the calculated slope is larger than a predetermined threshold, a sampling interval (moving amount) to a successive measurement point is made to be narrower than a sampling interval (moving amount) therebefore. Or when the calculated slope is smaller than the predetermined threshold, the sampling interval (moving amount) to the successive measurement point is made to be wide. By repeating the steps, even when a shape of a surface mixed with a region having a steep slope and a flat region is scanned, the slope can be measured by a sampling interval having an optimum measurement accuracy in accordance with a degree of the slope, and a number of times of up and down movement of the stylus accompanied by the sampling operation, or a measurement time period thereof can be optimized in accordance with an accuracy.

Further, according to the scanning probe microscope of the invention, as a result of carrying out sampling at the successive time point based on the sampling interval determined by the above-described method, when a variation in the observation data is larger than a certain predetermined value, scanning can be carried out again by narrowing the sampling interval further by temporarily moving back the scanning in a reverse direction. Thereby, when an actual shape becomes larger than the slope anticipated from data immediately therebefore, by scanning again only the portion, although a measurement time period is prolonged, a measurement result in which a measurement accuracy is not deteriorated more than a certain lower limit value can be achieved.

Further, according to the scanning probe microscope of the invention, when the surface is measured by so-to-speak raster scanning for scanning in X direction while successively changing a position in Y direction, a sampling interval in Y direction constituting a difference between Y coordinate of current scanning line and Y coordinate of a scanning line at next line is determined based on a shape of a scanning line acquired therebefore. A similarity between two or more of scanning line shapes measured immediately therebefore is evaluated, when the similarity is higher than a certain threshold, the sampling interval in Y direction is made to be wider. Further, when the similarity is equal to or smaller than the certain threshold, the sampling interval in Y direction is made to be narrower. Thereby, in a flat region in which a change in the shape is small in Y direction, by widening the sampling line interval, the measured time period can be shortened by reducing a number of lines while minimizing a reduction in the measurement accuracy, and in the region having the steep slope, although the measurement time period is increased, the measurement accuracy can be promoted by narrowing the sampling line interval. In this way, a measurement optimizing the measurement time period while ensuring the measurement accuracy in accordance with the shape of the surface can be carried out.

The above-described method can be combined with a control of making the sampling interval in X direction variable and both of effects can be achieved.

According to the scanning probe microscope and the scanning method according to the invention, when the surface shape mixed with the region having the steep slope and the flat region is measured, by making the sampling interval variable to be adapted to the shape of the surface while scanning the stylus, a measurement shortening the measurement time period by reducing a number of sampling points and optimizing an accuracy of the measurement data can be carried out such that the sampling interval is reduced in the region having the steep slope and the sampling interval in the flat region is increased.

DETAILED DESCRIPTION OF THE PREFERRED EMBODIMENTS

An explanation will be given of a method of scanning one line according to a first embodiment of a scanning probe microscope of the invention in reference to FIG. 1, FIG. 2, and FIG. 3 as follows.

Figure 1:
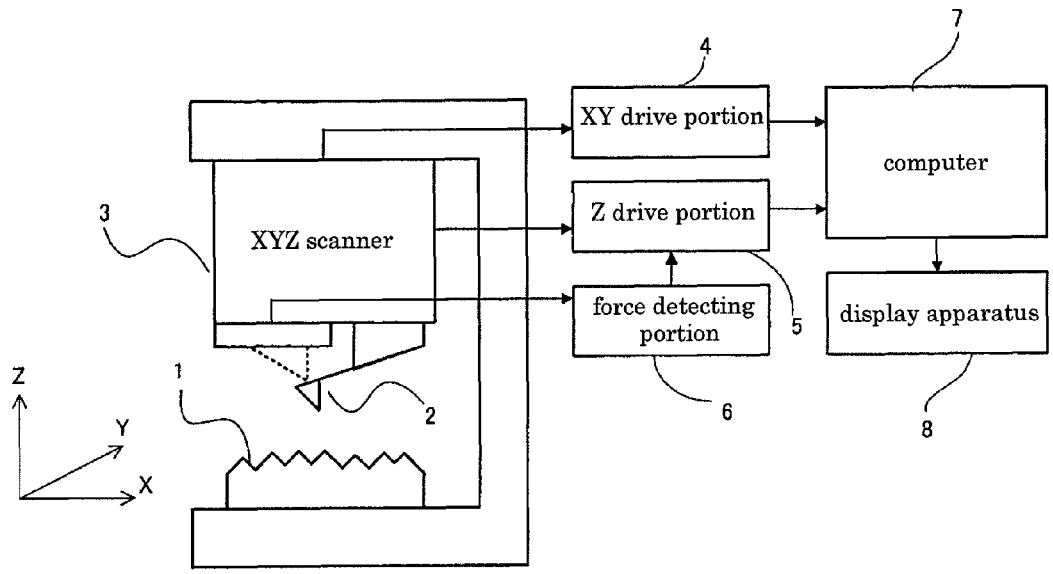
FIG. 1 is a block diagram of a scanning probe microscope according to an embodiment of the invention.

As shown by FIG. 1, the scanning probe microscope of the embodiment includes a stylus 2 capable of scanning in X and Y directions in parallel with a surface of a sample to be measured and moving in Z direction orthogonal to the surface of the sample relative to the surface of the sample, a force detecting portion 6 for detecting an interactive operation force received from the surface of the sample when the sample 2 is proximate to or brought into contact with the surface of the sample, a computer 7 (controlling means, observing means, and storing means) for controlling the stylus 2 and sampling observation data and storing coordinates of respective observation positions and observation data at positions thereof, and a display apparatus 8 for outputting the observation data to outside.

An explanation will be given as follows of a case of sampling the observation data by scanning the stylus relative to the surface of the sample and measuring an image of a shape of the surface of the sample by an amount of one line by the scanning probe microscope having such a constitution. When the image of the shape of the surface of the sample is measured by scanning over an XY plane, the measurement may be carried out by repeatedly scanning one line while changing a position of the Y position.

Figure 2:
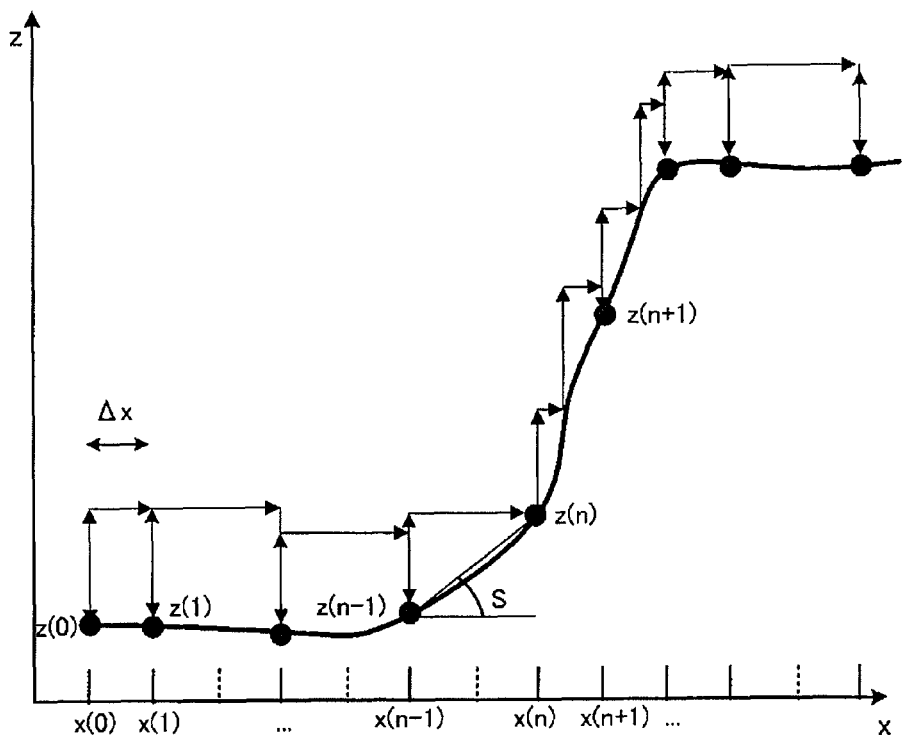
FIG. 2 shows a scanning locus of a stylus according to a first embodiment of the invention.
Figure 3:
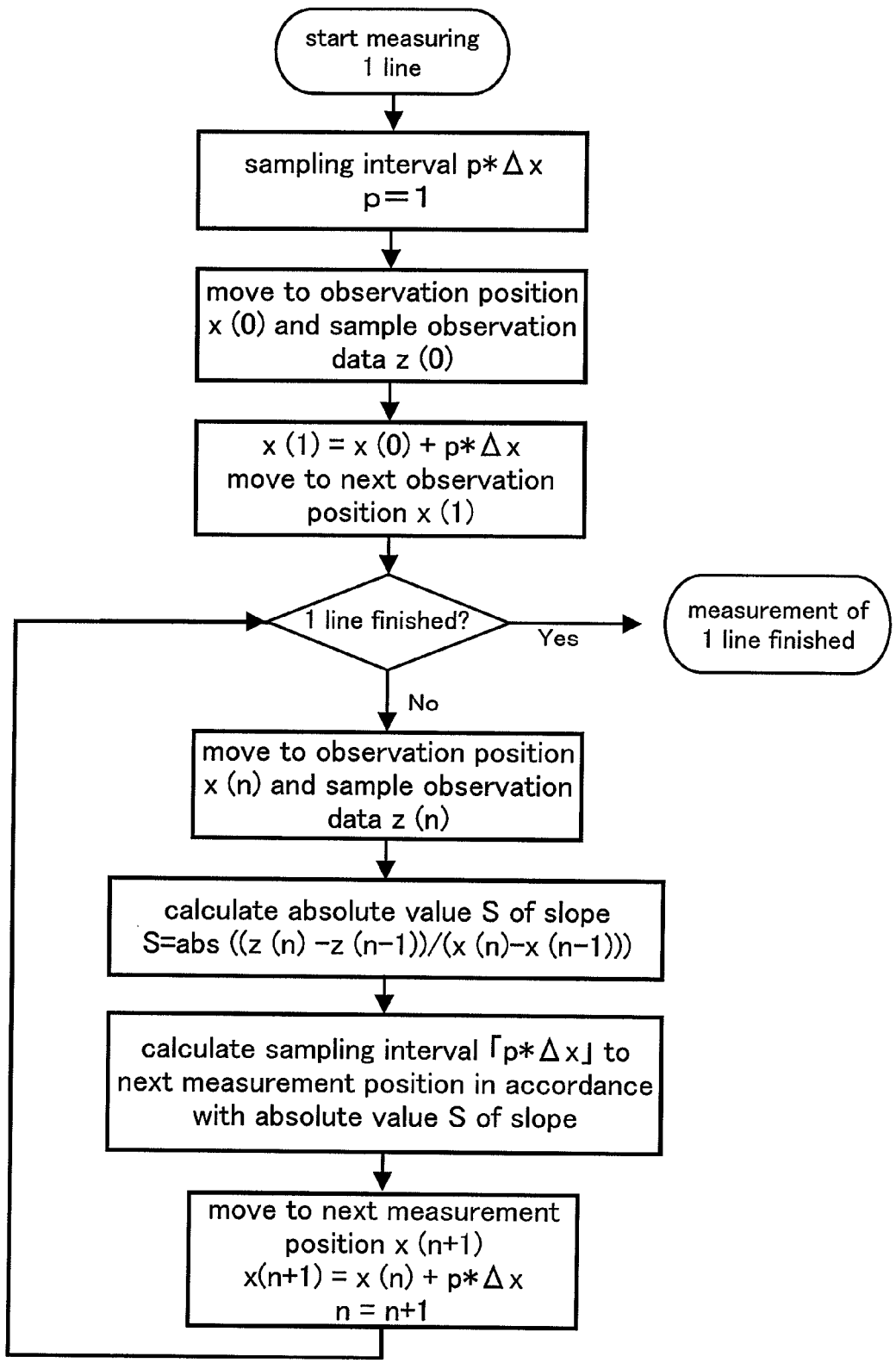
FIG. 3 is a flowchart showing a method of scanning a stylus according to the first embodiment of the invention.
Figure 4:
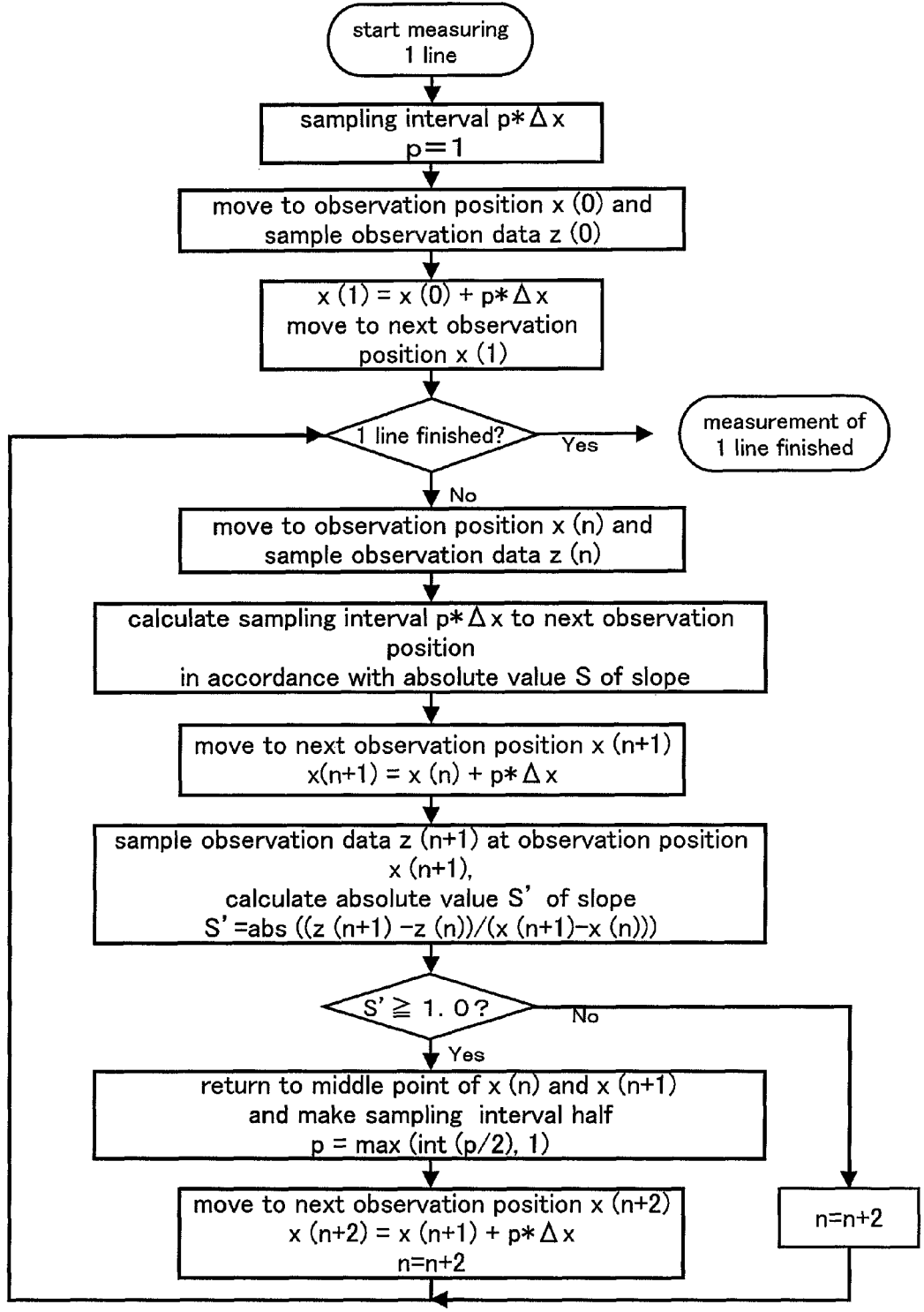
FIG. 4 is a flowchart showing a method of scanning a stylus according to a second embodiment of the invention.

FIG. 2 is a diagram showing a locus of a stylus of scanning one line, and FIG. 3 is a flowchart showing a procedure of scanning.

Before scanning, a sampling interval $p*\Delta x$ is set. A unit $\Delta x$ of the sampling interval indicates a minimum unit of the sampling interval, and an accuracy, scanning range and the like necessary in measuring the surface of the sample can previously be determined. Further, notation p designates an integer equal to or larger than 1, and an initial value thereof is made to be 1. The sampling interval constitutes a unit by $\Delta x$ and is varied by the unit multiplied by an integer in one scanning line.

First, the stylus is moved to observation position x (0). Next, the stylus is moved in Z direction to be proximate to the surface of the sample. When the stylus is proximate to or brought into contact with the surface of the sample, the force detecting portion senses a force, and therefore, the stylus is made to stop moving at the time point to sample observation data at observation position x (0), that is, position data z (0) in Z direction.

Next, the stylus is moved in Z direction to be remote from the surface of the sample by a previously determined distance $\Delta z$, for example, 10 nm. Thereafter, the stylus is moved in X direction until observation position x (1) of successive time. A distance from current observation position x (0) to observation position x (1) at successive time is $p*\Delta x$ in X direction.

When there is a projected shape having a height equal to or larger than $\Delta z$ on the surface of the sample in the midst of the moving procedure, the stylus is proximate to or brought into contact with the surface of the sample, however, this can be detected by the force detecting portion 6. When it is detected that the stylus is proximate thereto or brought into contact therewith, the stylus is immediately stopped temporarily from moving in X direction, the stylus is made to be remote from the surface of the sample by a distance $\Delta z$, thereafter, the stylus is restarted to move in X direction. In this way, the stylus is moved finally to observation position x (1) of successive time. When the stylus is moved to observation position x (1) of successive time, observation data z (1) at observation position x (1) is sampled similar to the operation at observation position x (0).

Successively, the scanning method will be explained by constituting n by 2 or more.

In a state of moving the stylus to current observation position x (n), observation data z (n) at x (n) is sampled similar to x (0). Next, observation position x (n+1) of successive time is determined as follows based on current observation position x (n) and observation data z (n) at the position, observation position x (n−1) immediately therebefore and observation data z(n−1) at the position.

That is, a slope S of a linear line connecting observation point immediately therebefore and current observation point by the following equation $$S=abs((z(n)-z(n-1))/(x(n)-x(n-1)))$$

Here, abs (x) is a function of calculating an absolute value of x.

Next, sampling interval $p*\Delta x$ from x (n) to x (n+1) is determined as follows.

| | |
|---|---|
| a case of $S \geq 2.0$ | p = max (int (p/4), 1) |
| a case of $1.0 \leq S < 2.0$ | p = max (int (p/2), 1) |
| a case of $0.5 \leq S < 1.0$ | p = p |
| a case of $0.25 \leq S < 0.5$ | p = min (2*p, pMax) |
| a case of $S < 0.25$ | p = min (4*p, pMax) |

Incidentally, max (x, y) is a function of calculating a value of a larger one of x and y, and int (x) is a function of calculating the integer value by rounding off a decimal point or smaller of x. min (x, y) is a function of calculating a value of a smaller one of x and y. Further, pMax is a scanning parameter indicating a maximum sampling interval which can be set, and adjusted by compromising a calculated scanning time period and a measurement accuracy of measurement data.

When the sampling interval $p*\Delta x$ is determined in this way, observation position x (n+1) of successive time is determined, and therefore, the stylus is moved in X direction until x (n+1). Even in the midst of the movement, similar to the movement from x (0) to x (1), when the stylus is proximate to or brought into contact with the surface of the sample, the stylus is made to be remote therefrom by $\Delta z$ at each time.

By repeating the above-described operation, observation data z (n) at respective observation positions x (n) are sampled. When observation position x (n) reaches a previously set scanning range, scanning of one line is finished.

Although p is constituted by an integer in the embodiment, a determinant for changing the sampling interval from slope S can also be replaced by a different equation constituting p by real number.

Next, an explanation will be given of a method of scanning respective scanning lines according to a second embodiment of a scanning probe microscope of the invention in reference to a flowchart diagram 4. A point of the second embodiment which differs from the first embodiment will be described as follows. According to the second embodiment, after determining x (n+1) based on the slope S, the stylus is moved to observation position x (n+1), and observation data z (n+1) is measured. Slope S' is calculated by a following equation from determined and sampled values of x (n), z (n), x (n+1), and z (n+1).

$S'=abs((z(n+1)-z(n))/(x(n+1)-x(n)))$

When the slope S' is equal to or larger than a previously determined certain value, for example, 1.0, scanning of the stylus is temporarily moved back. That is, the stylus is moved to a position between observation position x (n) and observation position x (n+1), for example, a middle point (x (n)+x (n+1))/2 of x (n) and (n+1), the position is newly set as x (n+1), and observation data z (n+1) at the position is sampled. Further, the sampling interval $p*\Delta x$ is contracted to a half as shown by the following equation.

$p=\max(int(p/2),1)$

Thereby, when as a result of measuring by a sampling interval determined from a shape data immediately therebefore, recesses and projections are larger than assumed ones, and a shape accuracy is deteriorated by the provided data, a measurement accuracy can be prevented from being deteriorated by making the sampling interval finer than that at preceding time by temporarily moving back the stylus and rescanning the stylus. When compared with the first embodiment, there is a possibility of further prolonging the measurement time period, however, an advantage of capable of providing data guaranteeing a lower limit of the measurement accuracy is achieved.

Figure 5:
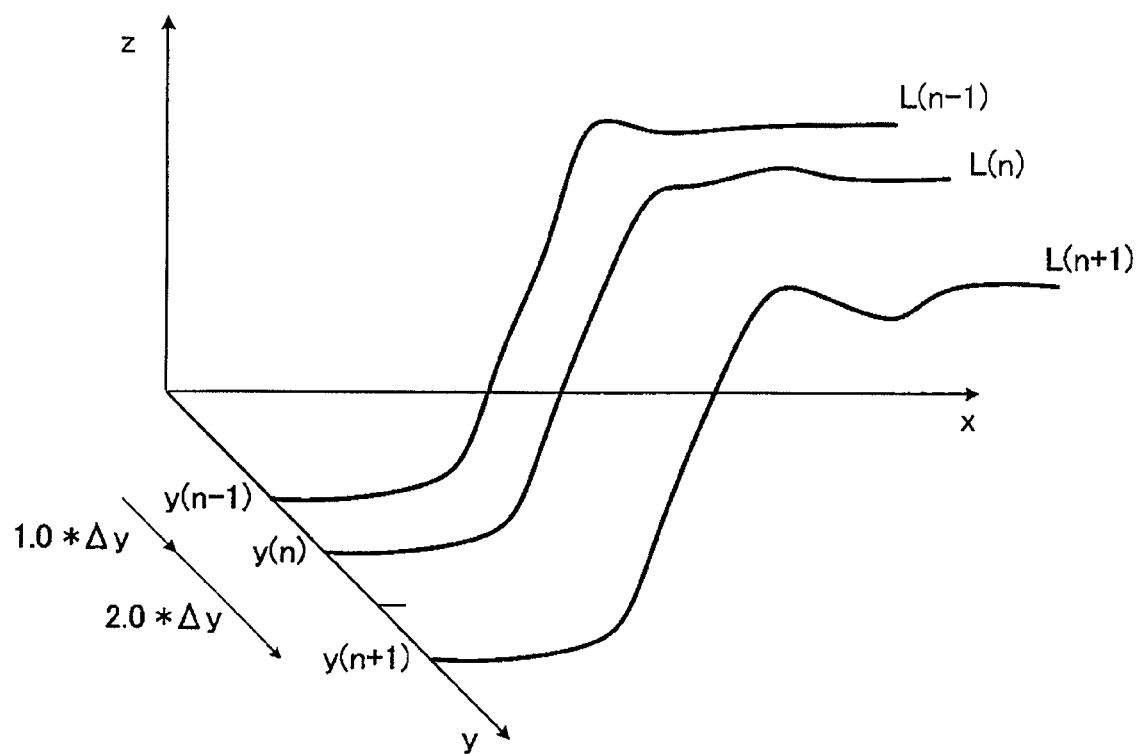
FIG. 5 shows a group of scanning loci of a stylus according to a third embodiment of the invention.
Figure 6:
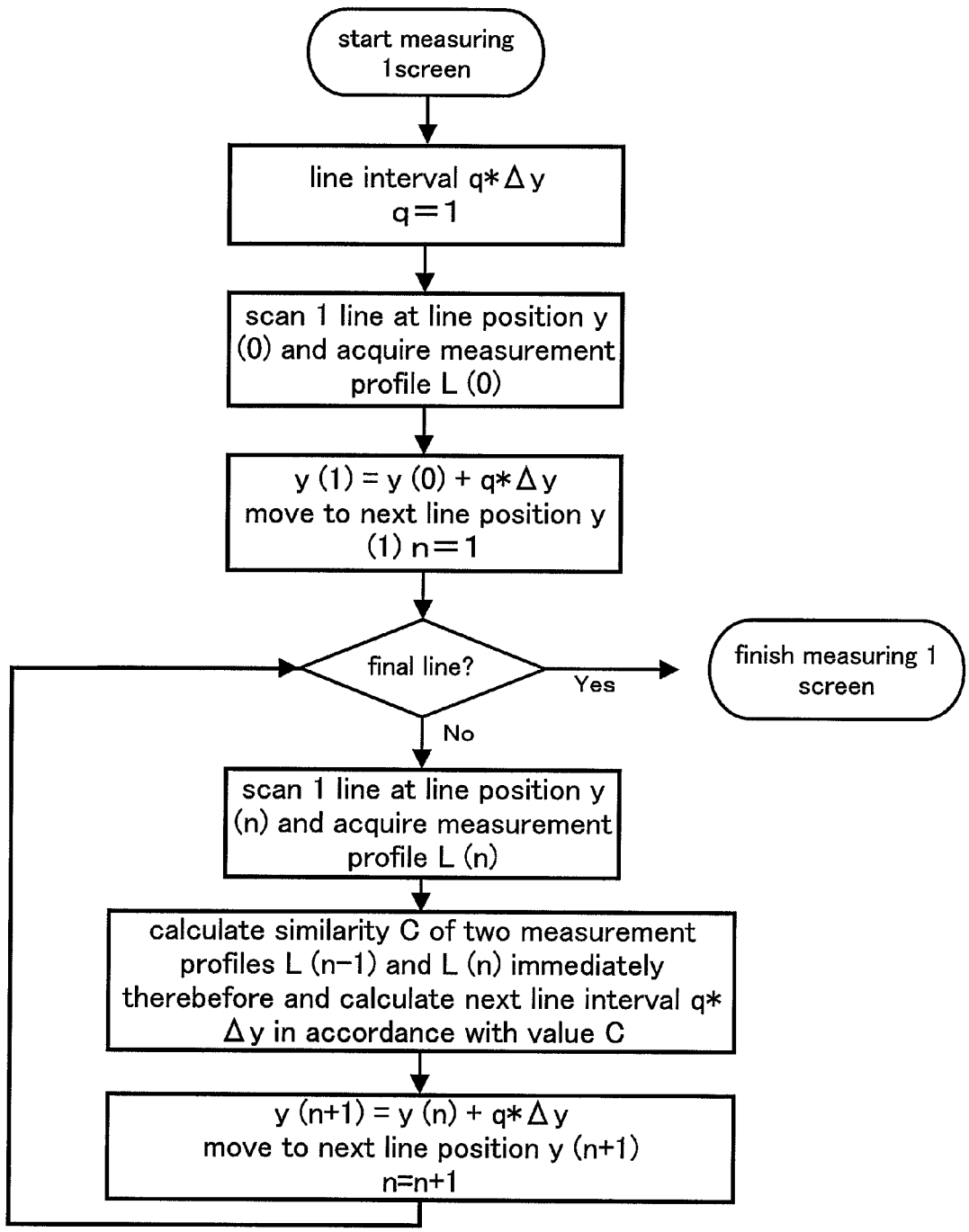
FIG. 6 is a flowchart showing a method of scanning a stylus according to the third embodiment of the invention.

Next, an explanation will be given of a scanning method of face scanning according to a third embodiment of a scanning probe microscope of the invention in reference to FIG. 5 and FIG. 6. FIG. 5 is a view showing a locus of a stylus of raster scanning according to the embodiment, and FIG. 6 is a flowchart showing a scanning procedure.

Before scanning, sampling interval $q*\Delta y$ in Y direction is set. A unit $\Delta y$ of a line interval indicates a minimum unit of the line interval, and the unit can previously be determined from an accuracy, a scanning range and the like necessary in measuring the surface of the sample. Further, notation q designates an integer equal to or larger than 1, and an initial value thereof is made to be 1. The line interval is made to constitute the unit by $\Delta y$ and is varied by the unit multiplied by an integer in one raster screen.

First, a measurement profile L (0) is measured by moving the stylus to an initial line position y (0) and scanning the stylus in X direction. The measurement profile is constituted by rows of measurement data at respective sampling points.

Next, the stylus is moved by $q*\Delta y$ in Y direction, a next line position y (1) is constituted thereby, the stylus is scanned similarly in X direction to acquire measurement profile L (1).

Next, when n is equal to or larger than 2, scanning of measurement profile L (n+1) is carried out by the following method.

A similarity between two data of measurement profile L (n−1) and measurement profile L (n) measured immediately therebefore is calculated. As one of methods of calculating the similarity, when a data row of measurement profile L (n−1) is designated by z1 {n} {n=0, 1, . . . , N}, a data row of measurement profile L (n) is designated by z2 (n) {n=0, 1, . . . , N}, and an intercorrelation function R (k) is written by the following equation, the similarity C can be defined by a maximum value of R (k) {k=0, . . . , N−1}

$$R(k) = \frac{1}{N-k} \sum_{n=0}^{N-k-1} (z1(n+k)*z2(n)) \quad \text{[equation 1]}$$

$$C = \max(R(0), \ldots, R(N-1))$$

In order to determine sampling interval $q*\Delta y$ in Y direction, calculated C and a certain previous determined value, for example, 0.9 are compared and, for example, the following determinant is used.

| | |
|---|---|
| a case of $C \geq 0.9$ | q = min (2*q, qMax) |
| a case of $C < 0.9$ | q = max (int (q/2), 1) |

Next, the stylus is moved from y (n) in Y direction by sampling interval $q*\Delta y$, the position is designated by y (n+1), and measurement profile L (n+1) is measured.

By repeating the above-described operation, measurement profiles L (n) at respective observation positions y (n) are sampled. When observation position y (n) reaches a previously set scanning range, scanning of one screen is finished.

Although according to the embodiment, q is constituted by an integer, a determinant for changing a line interval from the similarity C can be replaced by an equation different from the above-described by constituting q by a real number.

Further, although according to the embodiment, the similarity C is calculated from the intercorrelation function of measurement profile L (n−1) and measurement profile L (n), a function other than the intercorrelation function can also be used. For example, a determinant of the sampling interval can be determined by calculating a difference between profiles by D indicated by the following equation such that the more proximate D to 0, higher the similarity.

$$D = \frac{1}{N}\sum_{n=0}^{N-1}\left(\frac{z1(n) - z2(n)}{z1(n) + z2(n)}\right) \qquad \text{[equation 2]}$$

Further, although according to the embodiments described above, among measurement data, the sampling interval or the line interval is variably set by constituting a determination reference by the shape data. The invention is not limited only thereto but a determination reference of changing the sampling interval or the line interval may be constituted by using a kind of data other than the shape data, or a plurality of kinds of data. For example, in the case of a scanning probe microscope for simultaneously measuring a shape and a current value, there is conceivable a scanning method of making the sampling interval further dense in a region in which a variation in the current value is larger. Or, there is also conceivable a scanning method of adjusting the sampling interval in consideration both of the variation in the current value and the variation in the shape.

What is claimed is:

1. A scanning probe microscope comprising:
   a scanning stylus movable along X, Y and Z axes to follow a surface of a sample along a predetermined observation route along which a observation stop is recursively defined from a preceding observation stop;
   a location data reader configured to read location data indicative of a location of a observation point which is found by the scanning stylus moved down proximate to or into contact with the surface of the sample;
   a movement controller configured to move the scanning stylus along the observation route, wherein the movement controller moves the scanning stylus down to read the location data when the stylus reaches at an observation stop and moves the scanning stylus up when the scanning stylus comes proximate to or into contact with the surface of the sample en route between adjacent two observation positions; and
   a stop location calculator configured to define a next observation stop along the observation route, wherein coordinates of the next observation stop are a function of coordinates of a found observation point;
   wherein the observation route comprises rows of parallelly arranged sub-routes, and an interval to a next sub-route is recursively defined by the location data collected along a preceding row of sub-route.

2. The scanning probe microscope according to claim 1, wherein the coordinates of the next observation point are derived with an interval to the next observation stop which is a function of a slope calculated between one found observation point and another found observation point preceding to the one found observation point.

3. The scanning probe microscope according to claim 2, wherein the interval is a minimum interval multiplied by an integer number, which is a function of the slope.

4. The scanning probe microscope according to claim 3, wherein when the slope exceeds a threshold, the movement controller moves the scanning stylus back along the observation route to an intermediary stop at which the location data reader reads the location data, and the stop location calculator reduces the integer number derived from the slope and defines an interval to a next observation stop from the intermediary stop with the reduced integer number.

5. The scanning probe microscope according to claim 1, further comprising a next row location calculator that calculates the interval to the next row of sub-route, which is a function of a degree of similarity between the location data collected along two preceding rows of sub-routes.

6. The scanning probe microscope according to claim 5, wherein the interval is a minimum interval multiplied by an integer number which is a function of a degree of similarity between the location data collected along two preceding rows of sub-routes.

7. The scanning probe microscope according to claim 6, wherein when the degree of similarity is lower than a threshold, the movement controller moves the scanning stylus back in a row direction to an intermediary row location at which the location data reader collects the location data while the movement controller moves the scanning stylus along the intermediary row of sub-route, and the next row location calculator reduces the integer number derived from the degree of similarity and defines an interval to a next row from the intermediary row with the reduced integer number.

8. The scanning probe microscope according to claim 6, wherein the degree of similarity is derived from a difference between the location data collected along two preceding rows of sub-routes.

9. The scanning probe microscope according to claim 6, wherein the degree of similarity is derived from a correlation between the location data collected along two preceding rows of sub-routes.

* * * * *